United States Patent

[11] 3,580,367

| [72] | Inventor | Richard H. McCarthy<br>Milwaukee, Wis. |
|---|---|---|
| [21] | Appl. No. | 785,320 |
| [22] | Filed | Dec. 19, 1968 |
| [45] | Patented | May 25, 1971 |
| [73] | Assignee | Stearns Electric Corporation<br>Milwaukee, Wis. |

[54] UNIVERSAL MOUNTING PLATE AND CONSTRUCTION METHOD
2 Claims, 3 Drawing Figs.

[52] U.S. Cl. .................................................... 188/206,
188/171, 248/14
[51] Int. Cl. ......................................................... F16d 65/02
[50] Field of Search .......................................... 188/170,
206, 171, 218, 218 (A); 248/12, 14, 16, 19; 301/9
(DN)

[56] References Cited
UNITED STATES PATENTS

| 1,324,713 | 12/1919 | Adsit | 248/14 |
|---|---|---|---|
| 2,590,363 | 3/1952 | Adair | 301/9(DN) |
| 3,361,482 | 1/1968 | Stevens | 301/9(DN) |

*Primary Examiner*—Duane A. Reger
*Attorney*—Wheeler, House & Wheeler

ABSTRACT: Exemplification consists of a caliper brake end plate which also serves to mount the brake from a motor shell or the like. To hold the plate securely on motors having mounting bolts which are on bolt circles of differing radii, the plate is correspondingly arcuate about predetermined centers offset from the plate axis according to a formula.

PATENTED MAY 25 1971
3,580,367
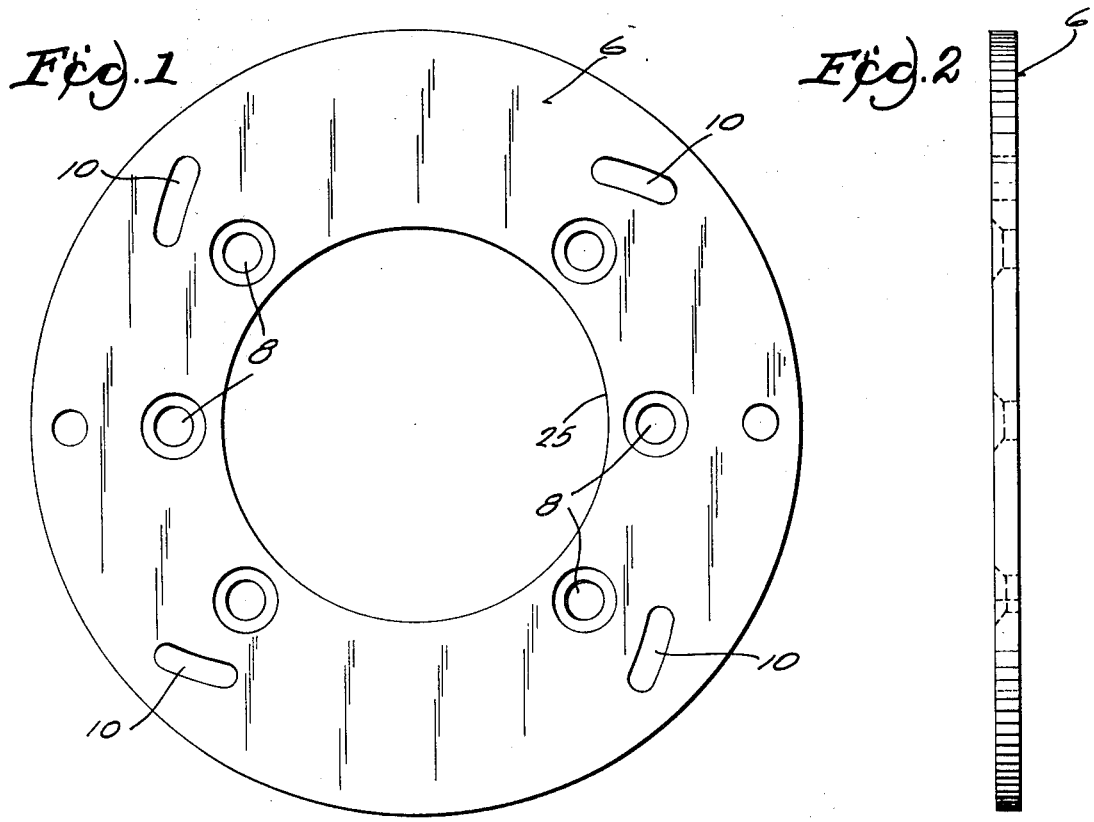
Fig. 1
Fig. 2
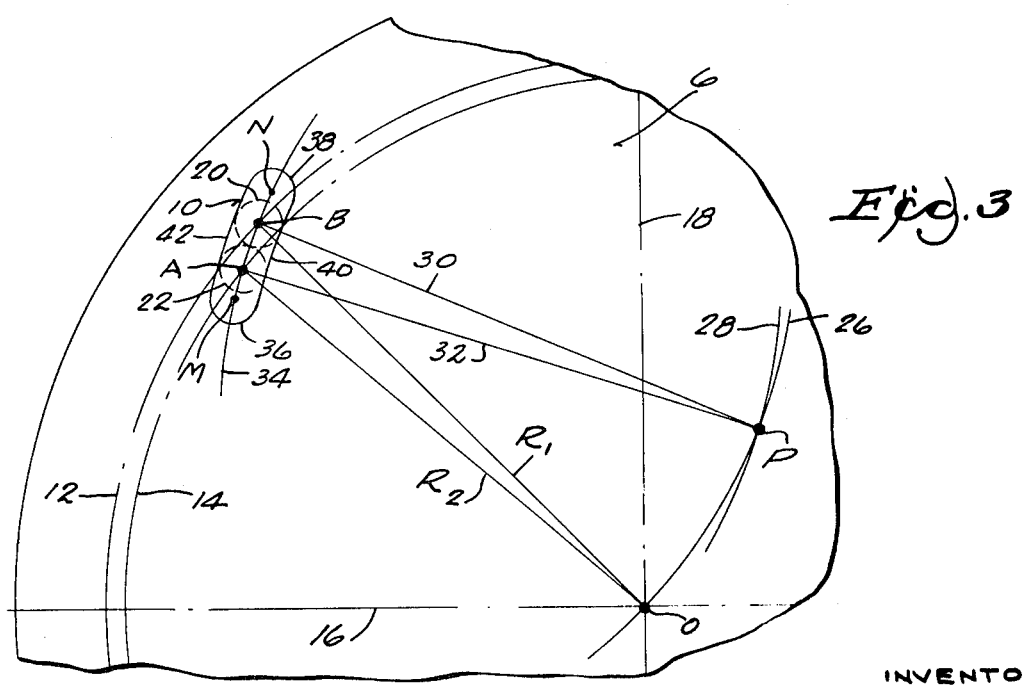
Fig. 3
INVENTOR
RICHARD H. McCARTHY
BY Wheeler, Wheeler, House & Clemency
ATTORNEYS

UNIVERSAL MOUNTING PLATE AND CONSTRUCTION METHOD

BACKGROUND OF INVENTION

Because the width of the various bolt-receiving openings must correspond closely to the diameter of the bolts, in order to provide requisite security of mounting, it has been customary to provide caliper brakes and other similarly mounted devices with interchangeable mounting plates having boltholes at different radii. Because the instant device was specially designed for use with motor shells made according to different standards, it will be described for such use but with the understanding that this is an exemplification. The same principles apply to other comparable mounting problems.

Generally radial slots to accommodate bolts at these different locations will not hold the plate securely and accurately enough to the motor shell.

SUMMARY OF INVENTION

This invention is not limited to caliper brakes. However, an exemplification of a mounting plate having arcuate slots located according to the formula herein disclosed has been shown in my companion application, Ser. No. 667,225, filed Sept. 12, 1967 and entitled Electromagnetically Released Spring-Applied Caliper Brake. In that application, the mounting plate is identified by reference character 16. Since the mounting plate also serves as one of the brake plates and the rest of the caliper brake mechanism is supported through this plate from the motor shell, it becomes desirable that the mounting plate and brake mechanism be centered accurately with regard to the axis of armature shaft rotation. To show the problem involved, it may be noted that one particular brake is sometimes required to be mounted on a motor shell on which the bolts are set in the motor shell in a bolt circle of 4.968, whereas the same brake is required to be mounted at other times upon a motor shell having a bolt circle of 5.125 diameter.

The present invention is based on the discovery that properly located arcuate slots of the width of the bolt diameter provide secure anchorage for the plate regardless of bolt circle radius within the range of the device. The location and direction of such slots can be accurately located by a formula as hereinafter disclosed.

BRIEF DESCRIPTION OF DRAWINGS

FIG. 1 is a view in elevation of a mounting plate embodying the invention.

FIG. 2 is a view of the mounting plate in side elevation.

FIG. 3 is a fragmentary diagrammatic view of a portion of the mounting plate on a greatly enlarged scale with construction lines showing how the arcuate slots for the bolts are located.

DESCRIPTION OF PREFERRED EMBODIMENT

There is nothing new about the outline of the plate, which is a flat metal disc or annulus 6 with an opening at 25 for the armature shaft and any requisite holes such as countersunk holes 8 for mounting the caliper brake or other parts to be carried from the motor shell (not shown here, but fragmentarily illustrated in my companion application above identified). Although no difficulties have been encountered because of variations in angular spacing of the mounting bolts, nevertheless the location of such bolts by different manufacturers on bolt circles of different radii from the axis of the armature shaft has quiet e commonly been experienced.

The disclosed plate is universally usable throughout quite a wide range with motor shells having their bolts at differing radii and without sacrificing the accuracy and rigidity of connection of the plate to the motor shell. This is accomplished by providing arcuate slots 10 of width corresponding to overall bolt cross section and therefore adapted to receive the bolts. It is, of course, desirable that these slots be located in quite precisely corresponding positions at quite precisely corresponding arcuate spacing, and that the width of each slot correspond quite precisely to the bolt diameter.

This result is achieved by punching, or making by one of several other methods, each of the slots 10 on an arc drawn around a center P located by the formula hereinafter stated, the several centers being at fixed distances from the axis 0 and in corresponding directions therefrom in their respectively indexed positions. The points P will, of course, be equally spaced angularly about the axis 0.

FIG. 3 shows diagrammatically how the center P is located.

There is first drawn about the axis 0 a circle 12 of radius $R^1$. This is the maximum bolt circle for which the plate is universal. The circle 12 is drawn through the locations of the bolt axes. There is next drawn a circle 14 of radius $R^2$, this being drawn through the axes of mounting bolts on the minimum bolt circle for which the plate is universal. A particular radius $R^1$ is then drawn from the axis 0 at an angle of 45° between the horizontal line 16 and the vertical line 18.

Where the radius $R^1$ intersects the bolt circle 12, a point B is marked. About the point B is drawn a circle 20 into which the bolt for which the plate is designed will fit snugly. Tangent to that circle, another circle 22 of like radius is drawn with its center A located on the bolt circle 14. The radius $R^2$ is then drawn from axis 0 to point A.

Using the radius $R^1$, an arc 26 is drawn around the point B. Using the same radius $R^1$, another arc 28 is drawn around point A. Where these two arcs intersect, the point P will be located. Construction lines 30 and 32 may respectively be drawn to point P from points B and A. These will be used solely for verification, since point P has now been located and can be used to swing an arc 34 through the points A and B. This arc represents the centerline of the slot 10. From point P its radius is equal to $R^1$.

The points N and M are now located on the arc 34 at any desired (but preferably uniform) spacing from points A and B, respectively. The arcs 36 and 38 about points N and M represent the maximum relative positions of a given bolt with respect to the mounting plate, in any given range. The arcs 36 and 38 of bolt diameter drawn around the points M and N respectively represent the ends of slot 10. The arcs 40 and 42 drawn around center P tangent to the various circles 20, 22, 36 and 38 represent the sides of the desired slot.

Those skilled in the art will recognize that the method above described is unnecessarily refined. The significant steps required are the drawing of the two bolt circles, the drawing of two angularly spaced radii intersecting the respective bolt circles as at points A and B; the swinging of arcs from these intersections A and B to intersect for the location of point P; and the swinging about point P of arcs which differ from each other in radii by the diameter of the bolt to be received in the slots. For convenience, it is useful to draw at least one of the circles 20 or 22 about one of the points of intersection of the construction radius with the bolt circle and of a diameter equal to that of the bolt so that the arcs representing the side margins 40 and 42 can be tangent to this last-mentioned circle 20 or 22, thus providing an easy means for determining what the width of the slot must be.

After one of the slots 10 has been located and milled, the plate is indexed and another slot milled in like manner. The first slot may provide a pattern to define the form of the second and each subsequent slot at locations defined by indexing. Assuming that there are four boltholes, there will be four slots at equal angular spacing.

It is deemed unnecessary to reproduce here the showing that I have made geometrically, through the use of arithmetical computations, verifying the locations of the sidewalls 40 and 42 as determined graphically in the manner above described.

I claim:

1. A universal mounting plate for attaching a driven device to the mounting bolts of a motor shell regardless of variation of the radius of the mounting bolt circle within a predetermined range, said plate being provided at predetermined angular spacing with slots of corresponding dimensions, said dimensions including a width which is substantially equal to the diameter of the respective bolts, each of said slots having corresponding arcuate curvature around corresponding points similarly offset from the center of said disc, the slots having sufficient arcuate extent so that their respective ends intersect bolt circles at the extreme of said range, and being so disposed as to fit snugly upon bolts at equal angular spacing in the respective circles.

2. A universal mounting plate for attaching a driven device to the mounting bolts of a motor shell regardless of variation of the radius of the mounting bolt circle within a predetermined range, said plate comprising the fixed disc of a caliper brake which constitutes the said driven device to be attached to the motor shell and is adapted to act on the armature shaft with which the motor shell is provided, said plate having centrally an opening for said armature shaft and having slots at predetermined angular spacing and in proximity to the outer perimeter of said plate, said slots being of corresponding dimensions including a width which is substantially equal to the diameter of the respective bolts, each of said slots having corresponding arcuate curvature around corresponding points similarly offset from the center of said disc, the slots having sufficient arcuate extent so that their respective ends intersect bolt circles at the extreme of said range, and being so disposed as to fit snugly upon bolts at equal angular spacing in the respective circles.